(12) United States Patent
Harada et al.

(10) Patent No.: US 12,447,537 B2
(45) Date of Patent: Oct. 21, 2025

(54) CUTTING INSERT AND METHOD OF MANUFACTURING CUTTING INSERT

(71) Applicant: Sumitomo Electric Hardmetal Corp., Itami (JP)

(72) Inventors: Gaku Harada, Itami (JP); Satoru Hirao, Itami (JP); Ikurou Itohara, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 414 days.

(21) Appl. No.: 18/010,226

(22) PCT Filed: Jun. 17, 2020

(86) PCT No.: PCT/JP2020/023736
§ 371 (c)(1),
(2) Date: Dec. 14, 2022

(87) PCT Pub. No.: WO2021/255852
PCT Pub. Date: Dec. 23, 2021

(65) Prior Publication Data
US 2023/0321732 A1    Oct. 12, 2023

(51) Int. Cl.
*B23B 27/16* (2006.01)
*B23P 15/28* (2006.01)
*B23B 27/14* (2006.01)

(52) U.S. Cl.
CPC .......... *B23B 27/1611* (2013.01); *B23P 15/28* (2013.01); *B23B 27/145* (2013.01); *B23B 2240/08* (2013.01)

(58) Field of Classification Search
CPC .............. B23B 27/1611; B23B 27/145; B23B 2240/08; B23B 2200/0471; B23B 2200/0447; B23C 5/202; B23K 1/0008
See application file for complete search history.

(56) References Cited

U.S. PATENT DOCUMENTS 2,475,565 A * 7/1949 Houchins ................. B24D 3/14
                                                     501/144
3,369,283 A * 2/1968 Colding .................. B23P 15/30
                                                     407/119
(Continued)

FOREIGN PATENT DOCUMENTS

JP    S56-52604 U    5/1981
JP    58-120406 A    7/1983
(Continued)

*Primary Examiner* — Sara Addisu
(74) *Attorney, Agent, or Firm* — XSENSUS LLP

(57) ABSTRACT

A cutting insert includes a substrate and a cutting-edge insert. The substrate has, in a thickness direction of the substrate, a bottom surface, and a top surface opposite to the bottom surface. The top surface has a polygonal shape composed of a plurality of sides in a plan view as seen along the thickness direction. The top surface is provided with a projection projecting to a side opposite to the bottom surface along the thickness direction. The projection has a through-hole passing through the substrate along the thickness direction. The projection has a side surface contiguous to the top surface. The side surface is composed of a curved line protruding to a side opposite to the through-hole in the plan view as seen along the thickness direction.

4 Claims, 10 Drawing Sheets

(56) References Cited

U.S. PATENT DOCUMENTS

| | | | | |
|---|---|---|---|---|
| 4,448,591 A * | 5/1984 | Ohno | B24D 3/06 | 264/642 |
| 4,504,284 A * | 3/1985 | Ohno | B23B 27/145 | 51/293 |
| 4,561,810 A * | 12/1985 | Ohno | B23B 27/145 | 76/101.1 |
| 4,632,606 A * | 12/1986 | Lagerberg | B23B 27/1622 | 407/104 |
| 4,666,349 A * | 5/1987 | Altmeyer | B23B 27/148 | 76/DIG. 10 |
| 4,698,070 A * | 10/1987 | Ohno | B24D 3/06 | 51/307 |
| 4,854,784 A * | 8/1989 | Murray | B23B 27/141 | 407/119 |
| 5,193,948 A * | 3/1993 | Noggle | B23B 27/141 | 407/119 |
| 5,405,711 A * | 4/1995 | Noggle | B32B 18/00 | 407/115 |
| 5,846,032 A * | 12/1998 | Murakami | B23B 27/1622 | 407/104 |
| 6,155,755 A * | 12/2000 | Kanada | B23K 35/32 | 407/119 |
| 6,315,502 B1 * | 11/2001 | Maurer | B23B 27/141 | 407/119 |
| 6,705,806 B2 * | 3/2004 | Okamura | B23B 27/145 | 407/119 |
| 7,510,352 B2 * | 3/2009 | Craig | B23C 5/2247 | 407/107 |
| 9,242,299 B2 * | 1/2016 | Taylor | B23B 27/145 | |
| 10,207,330 B2 * | 2/2019 | Fiori | B23B 27/1651 | |
| 10,596,637 B2 * | 3/2020 | Sasaki | C22C 1/05 | |
| 10,654,116 B2 * | 5/2020 | Kawasaki | B23B 27/1677 | |
| 11,759,871 B2 * | 9/2023 | Sasaki | B23C 5/109 | 407/30 |
| 2002/0131832 A1 * | 9/2002 | Morsch | B23B 27/045 | 407/119 |
| 2005/0076755 A1 * | 4/2005 | Zimmerman | B28D 1/16 | 407/113 |
| 2005/0123366 A1 * | 6/2005 | Goudemond | B23P 15/28 | 407/113 |
| 2005/0152804 A1 * | 7/2005 | Sjogren | B23B 27/141 | 407/119 |
| 2005/0271483 A1 * | 12/2005 | Sjogren | B23B 27/145 | 407/119 |
| 2007/0207715 A1 * | 9/2007 | Webb | B23P 15/28 | 451/540 |
| 2008/0292415 A1 * | 11/2008 | Kuroda | B23B 27/145 | 83/53 |
| 2010/0172704 A1 * | 7/2010 | Nelson | B23B 27/145 | 407/116 |
| 2011/0299948 A1 * | 12/2011 | Edler | B23B 27/145 | 407/115 |
| 2012/0230785 A1 * | 9/2012 | Chen | B23B 27/141 | 407/114 |
| 2013/0236258 A1 * | 9/2013 | Nada | B23B 27/1607 | 407/114 |
| 2013/0276970 A1 * | 10/2013 | Linnane | B23P 15/30 | 156/252 |
| 2013/0343826 A1 * | 12/2013 | Webb | B23B 27/145 | 264/682 |
| 2015/0016902 A1 * | 1/2015 | Okamura | B23B 27/148 | 407/116 |
| 2016/0297010 A1 * | 10/2016 | Kukino | B24B 3/34 | |
| 2017/0189969 A1 * | 7/2017 | Hirosaki | B23B 27/14 | |
| 2018/0009040 A1 * | 1/2018 | Sasaki | B23B 27/143 | |
| 2021/0323074 A1 * | 10/2021 | Ikeda | B23B 27/20 | |
| 2022/0001455 A1 * | 1/2022 | Ikeda | B23B 27/141 | |

FOREIGN PATENT DOCUMENTS

| | | |
|---|---|---|
| JP | 60-53404 U | 4/1985 |
| JP | 10-118824 A | 5/1998 |
| JP | 2008-501539 A | 1/2008 |
| JP | 2009-529432 A | 8/2009 |
| JP | 2013-530844 A | 8/2013 |
| JP | 2014-121772 A | 7/2014 |
| WO | 2005/118188 A2 | 12/2005 |
| WO | 2007/103939 A2 | 9/2007 |
| WO | 2012/007429 A1 | 1/2012 |

* cited by examiner

CUTTING INSERT AND METHOD OF MANUFACTURING CUTTING INSERT

CROSS-REFERENCE TO RELATED APPLICATION

The present application is based on PCT filing PCT/JP2020/023736, filed Jun. 17, 2020, the entire contents of which are incorporated herein by reference.

TECHNICAL FIELD

The present disclosure relates to a cutting insert and a method of manufacturing the cutting insert.

BACKGROUND ART

PTL 1 (Japanese Utility Model Laying-Open No. 60-53404) discloses a cutting tool. The cutting tool disclosed in PTL 1 includes a core and a plurality of hard sintered material pieces. The plurality of sintered material pieces are joined to the core.

CITATION LIST

Patent Literature

PTL 1: Japanese Utility Model Laying-Open No. 60-53404

SUMMARY OF INVENTION

A cutting insert according to the present disclosure includes a substrate and a cutting-edge insert. The substrate has, in a thickness direction of the substrate, a bottom surface, and a top surface opposite to the bottom surface. The top surface has a polygonal shape composed of a plurality of sides in a plan view as seen along the thickness direction. The top surface is provided with a projection projecting to a side opposite to the bottom surface along the thickness direction. The projection Has a through-hole passing through the substrate along the thickness direction. The projection has a side surface contiguous to the top surface. The side surface is composed of a curved line protruding to a side opposite to the through-hole in the plan view as seen along the thickness direction. The curved line includes a plurality of vertices at positions at which the curved ling has a minimum distance from the plurality of sides, respectively. The cutting-edge insert is brazed to the top surface and the side surface so as to annularly surround the projection. The cutting-edge insert includes a plurality of divided pieces. A number of the plurality of divided pieces is equal to a number of the plurality of sides. The plurality of divided pieces in a longitudinal direction extend along the plurality of sides, respectively. Each of the plurality of divided pieces has, in the longitudinal direction, a first end, and a second end opposite to the first end. Each of the plurality of divided pieces has a first protrusion at the first end, and a second protrusion at the second end. The first protrusion of one divided piece among the plurality of divided pieces retains the second protrusion of another divided piece among the plurality of divided pieces between the side surface and the first protrusion of the one divided piece, the other divided piece being adjacent to the one divided piece. Positions of centers of gravity of the plurality of divided pieces are displaced from the plurality of vertices, respectively, in the longitudinal direction.

DESCRIPTION OF EMBODIMENTS

Figure 1:
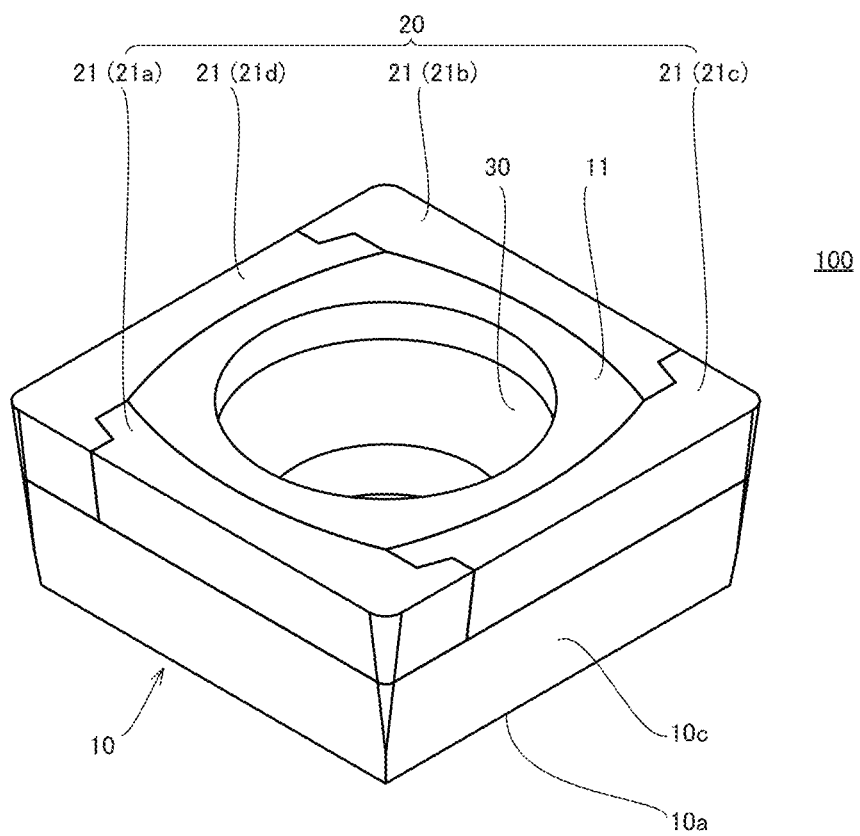
FIG. 1 is a perspective view of a cutting insert 100.

Problem to be Solved by the Present Disclosure

In the cutting tool disclosed in PTL 1, in brazing of the plurality of hard sintered material pieces to the core, the respective positions of the plurality of hard sintered material pieces may be displaced due to a surface tension of a brazing material. This may cause a gap between the plurality of hard sintered material pieces.

The present disclosure has been made in view of the above-mentioned problem with the conventional technology. More specifically, the present disclosure provides a cutting insert that can suppress the generation of a gap between a plurality of divided pieces of a cutting-edge insert, and also provides a method of manufacturing the cutting insert.

Effects of the Present Disclosure

The cutting insert according to the present disclosure can suppress the generation of a gap between the plurality of divided pieces of the cutting-edge insert.

Description of Embodiments of the Present Disclosure

First, embodiments of the present disclosure will be listed and described.

(1) A cutting insert according to an embodiment includes a substrate and a cutting-edge insert. The substrate has, in a thickness direction of the substrate, a bottom surface, and a top surface opposite to the bottom surface. The top surface has a polygonal shape composed of a plurality of sides in a plan view as seen along the thickness direction. The top surface is provided with a projection projecting to a side opposite to the bottom surface along the thickness direction. The projection has a through-hole passing through the substrate along the thickness direction. The projection has a side surface contiguous to the top surface. The side surface is composed of a curved line protruding to a side opposite to the through-hole in the plan view as seen along the thickness direction. The curved line includes a plurality of vertices at positions at which the curved line has a minimum distance from the plurality of sides, respectively. The cutting edge insert is brazed to the top surface and the side surface so as to annularly surround the projection. The cutting-edge insert includes a plurality of divided pieces. A number of the plurality of divided pieces is equal to a number of the plurality of sides. The plurality of divided pieces in a longitudinal direction extend along the plurality of sides, respectively. Each of the plurality of divided pieces has, in the longitudinal direction, a first end, and a second end opposite to the first end. Each of the plurality of divided pieces has a first protrusion at the first end, and a second protrusion at the second end. The first protrusion of one divided piece among the plurality of divided pieces retains the second protrusion of another divided piece among the plurality of divided pieces between the side surface and the first protrusion of the one divided piece, the other divided piece being adjacent to the one divided piece. Positions of centers of gravity of the plurality of divided pieces are displaced from the plurality of vertices, respectively, in the longitudinal direction.

The cutting insert according to (1) above can suppress the generation of a gap between the plurality of divided pieces of the cutting-edge insert. The cutting insert according to (1) above can also reduce the amount of a raw material used for the cutting-edge insert and the cost for processing the cutting-edge insert. Further, the cutting insert according to (1) above can use more portions of the cutting-edge insert as cutting edges.

(2) In the cutting insert according to (1) above, the curved line may be composed of a plurality of partial arcs. The plurality of partial arcs may face the plurality of sides, respectively. In the plan view as seen along the thickness direction, a distance between a corner of the projection and a center of the through-hole may be larger than a distance between each of the plurality of vertices and the center. In this case, the amount of a raw material used for the cutting-edge insert can be reduced further.

(3) In the cutting insert according to (1) or (2) above, the cutting-edge insert may be made of a cubic boron nitride sintered material or a polycrystalline diamond sintered material.

(4) A method of manufacturing a cutting insert according to an embodiment includes preparing a substrate and a cutting-edge insert, and brazing the cutting-edge insert to the substrate. The substrate has, in a thickness direction of the substrate, a bottom surface, and a top surface opposite to the bottom surface. The top surface has a polygonal shape composed of a plurality of sides in a plan view as seen along the thickness direction. The top surface is provided with a projection projecting to a side opposite to the bottom surface along the thickness direction. The projection has a through-hole passing through the substrate along the thickness direction. The projection has a side surface contiguous to the top surface. The side surface is composed of a curved line protruding to a side opposite to the through-hole in the plan view as seen along the thickness direction. The curved line includes a plurality of vertices at positions at which the curved line has a minimum distance from the plurality of sides, respectively. The cutting-edge insert is brazed to the top surface and the side surface so as to annularly surround the projection. The cutting-edge insert includes a plurality of divided pieces. A number of the plurality of divided pieces is equal to a number of the plurality of sides. The plurality of divided pieces in a longitudinal direction extend along the plurality of sides, respectively. Each of the plurality of divided pieces has, in the longitudinal direction, a first end, and a second end opposite to the first end. Each of the plurality of divided pieces has a first protrusion at the first end, and a second protrusion at the second end. The first protrusion of one divided piece among the plurality of divided pieces retains the second protrusion of another divided piece among the plurality of divided pieces between the side surface and the first protrusion of the one divided piece, the other divided piece being adjacent to the one divided piece. Positions of centers of gravity of the plurality of divided pieces are displaced from the plurality of vertices, respectively, in the longitudinal direction.

The method of manufacturing a cutting insert according to (4) above can suppress the generation of a gap between the plurality of divided pieces of the cutting-edge insert. The method of manufacturing a cutting insert according to (4) above can also reduce the amount of a raw material required for the cutting-edge insert and the cost for processing the cutting-edge insert. Further, the method of manufacturing a cutting insert according to (4) above can use more portions of the cutting-edge insert as cutting edges.

Details of Embodiments of the Present Disclosure

Next, details of embodiments of the present disclosure will be described with reference to the drawings. The same or corresponding parts in the drawings have the same reference characters allotted, and redundant description will not be repeated.

Structure of Cutting Insert According to Embodiments

The structure of a cutting insert (hereinafter referred to as "cutting insert 100") according to an embodiment will be described below.

FIG. 1 is a perspective view of cutting insert 100, As shown in FIG. 1, cutting insert 100 includes a substrate 10 and a cutting-edge insert 20.

Substrate 10

Figure 2:
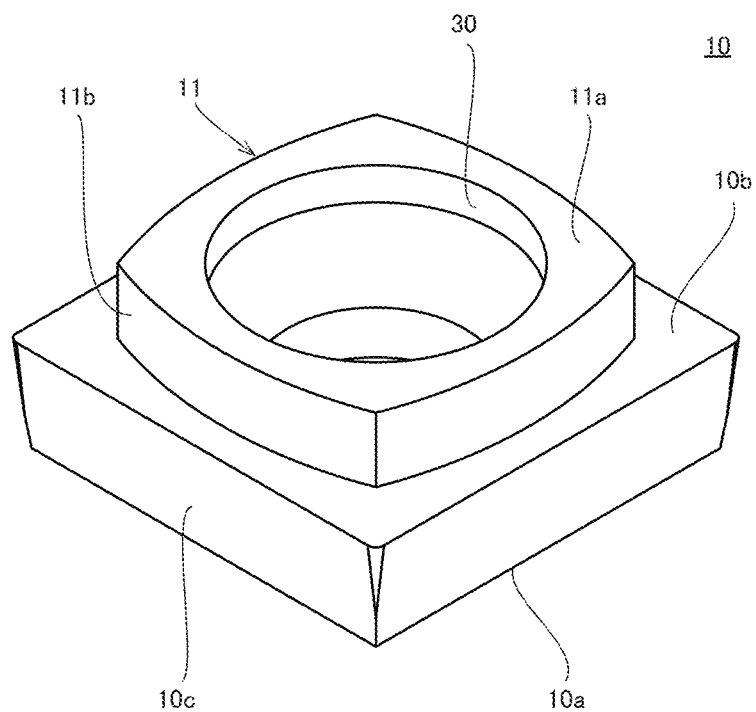
FIG. 2 is a perspective view of a substrate 10.
Figure 3:
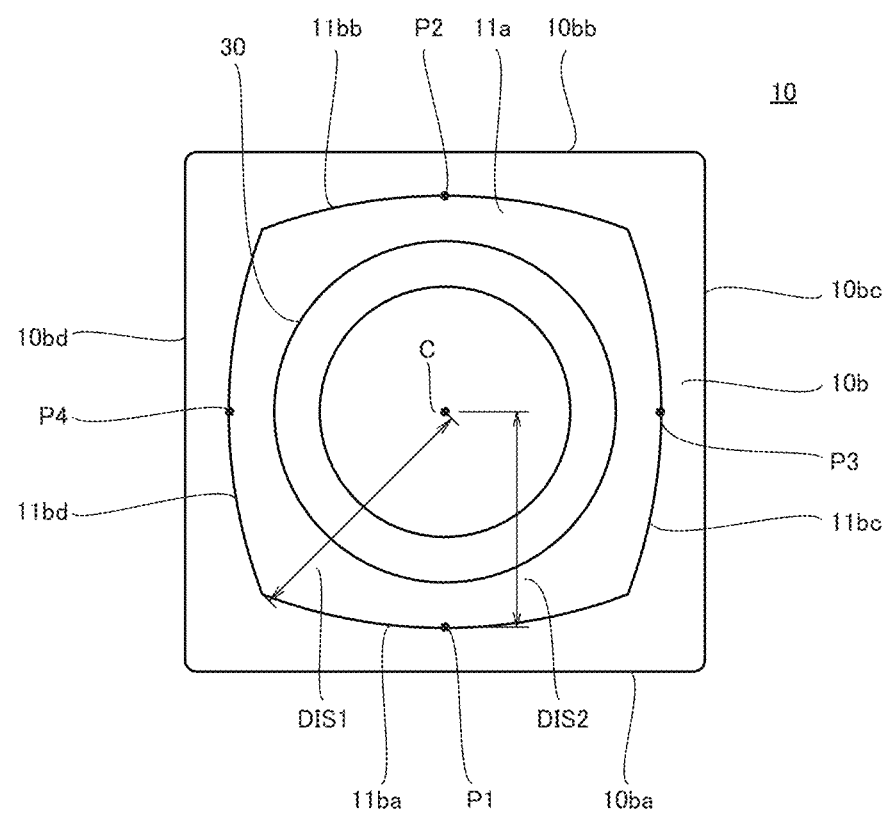
FIG. 3 is a plan view of substrate 10.

Substrate 10 is made of, for example, cemented carbide. Alternatively, substrate 10 may be made of a material other than cemented carbide. FIG. 2 is a perspective view of substrate 10. FIG. 3 is a plan view of substrate 10. As shown in FIGS. 2 and 3, substrate 10 has a bottom surface 10*a* and a top surface 10*b* in a thickness direction of substrate 10. Top surface 10*b* is opposite to bottom surface 10*a*. Substrate 10 further has a side surface 10*c*. Side surface 10*c* is contiguous to bottom surface 10*a* and top surface 10*b*.

Top surface 10*b* has a polygonal shape in a plan view as seen along the thickness direction of substrate 10 (hereinafter, merely referred to as "plan view"). The polygonal shape may not be a mathematically rigorous polygonal shape. For example, substrate 10 has a polygonal shape in plan view even when top surface 10*b* has rounded corners. In the example of FIG. 3, top surface 10*b* has a quadrangular shape (square shape).

The above-mentioned polygonal shape (top surface 10*b*) is composed of a first side 10*ba*, a second side 10*bb*, a third side 10*bc*, and a fourth side 10*bd*. First side 10*ba* is contiguous to third side 10*bc* at one end and is contiguous to fourth side 10*bd* at the other end. Second side 10*bb* is contiguous to fourth side 10*bd* at one end and is contiguous to third side 10*bc* at the other end.

Top surface 10*b* is provided with a projection 11. Projection 11 projects to the side opposite to bottom surface 10*a* in the thickness direction of substrate 10. In other words, there is a difference in level between projection 11 and top surface 10*b*. Projection 11 is located at the center of top surface 10*b* in plan view.

Projection 11 has a top surface 11*a* and a side surface 11*b*. Top surface 11*a* is parallel to, for example, top surface 10*b* (bottom surface 10*a*). Side surface 11*b* is contiguous to top surface 11*a* and top surface 10*b*.

Projection 11 (top surface 11*a*) has a through-hole 30. Through-hole 30 passes through substrate 10 (cutting insert 100) along the thickness direction of substrate 10. Through-hole 30 is located at the center of projection 11 (at the center of top surface 11*a*) in plan view. Through-hole 30 has a circular shape in plan view. The center of through-hole 30 in plan view is referred to as a center C.

Though not shown, a clamping screw passes through through-hole 30. As the clamping screw is fitted to a holder (not shown), cutting insert 100 is engaged with the holder to be fixed.

In plan view, side surface 11*b* is composed of a curved line protruding to the side opposite to through-hole 30. More specifically, side surface 11*b* includes a first surface 11*ba*, a second surface 11*bb*, a third surface 11*bc*, and a fourth surface 11*bd*. First surface 11*ba* to fourth surface 11*bd* face first side 10*ba* to fourth side 10*bd*, respectively.

In a plan view orthogonal to top surface 10*b*, each of first surface 11*ba* to fourth surface 11*bd* is composed of a partial arc. In other words, in plan view, side surface 11*b* is composed of an equal number of partial arcs to the number of sides of top surface 10*b*. The partial arcs have a radius of curvature larger than the radius of a circle indicating through-hole 30 in plan view.

In plan view, the curved line indicating side surface 11*b* has a plurality of vertices at positions at which the curved line has a minimum distance from the sides of top surface 10*b*, respectively. Among the vertices, the vertex of the partial arc indicating first surface 11*ba* is referred to as a vertex P1, the vertex of the partial arc indicating second surface 11*bb* is referred to as a vertex P2, the vertex of the partial arc indicating third surface 11*bc* is referred to as a vertex P3, and the vertex of the partial arc indicating fourth surface 11*bd* is referred to as a vertex P4.

The distance between a corner of projection 11 and center C in plan view is referred to as a distance DIS1. The distance between vertex P1 (vertex P2, vertex P3, vertex P4) and center C in plan view is referred to as a distance DIS2. Distance DIS1 is, for example, larger than distance DIS2.

Cutting-Edge Insert

Cutting-edge insert 20 is made of, for example, a cubic boron nitride sintered material. The cubic boron nitride sintered material is a sintered material including cubic boron nitride particles and a binder such as cobalt. Cutting-edge insert 20 may be made of a polycrystalline diamond sintered material. The polycrystalline diamond sintered material is a sintered material including diamond particles and a binder such as cobalt. Cutting-edge insert 20 may be made of a material higher in hardness than substrate 10 other than the cubic boron nitride sintered material and the polycrystalline diamond sintered material.

Cutting-edge insert 20 is divided into a plurality of divided pieces 21 in plan view. The number of divided pieces 21 is four. Specifically, cutting-edge insert 20 is divided into an equal number of divided pieces 21 to the number of sides of top surface 10*b*. Divided pieces 21 have, for example, the same shape. The respective four divided pieces may be referred to as a divided piece 21*a*, a divided piece 21*b*, a divided piece 21*c*, and a divided piece 21*d* below.

As shown in FIG. 1, cutting-edge insert 20 is arranged on top surface 10*b* so as to annularly surround projection 11. More specifically, cutting-edge insert 20 is arranged on top surface 10*b* such that the longitudinal direction of divided piece 21*a* extends along first side 10*ba*, the longitudinal direction of divided piece 21*b* extends along second side 10*bb*, the longitudinal direction of divided piece 21*c* extends along third side 10*bc*, and the longitudinal direction of divided piece 21*d* extends along fourth side 10*bd* (see FIG. 5).

Figure 4A:
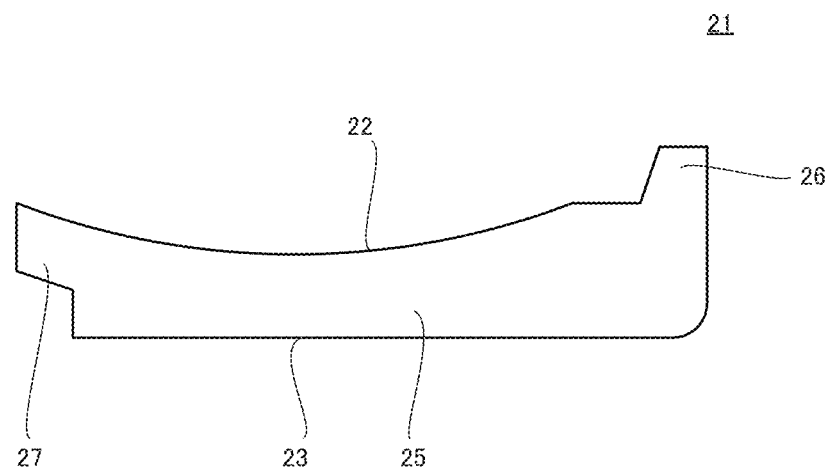
FIG. 4A is a plan view of a divided piece 21.
Figure 4B:
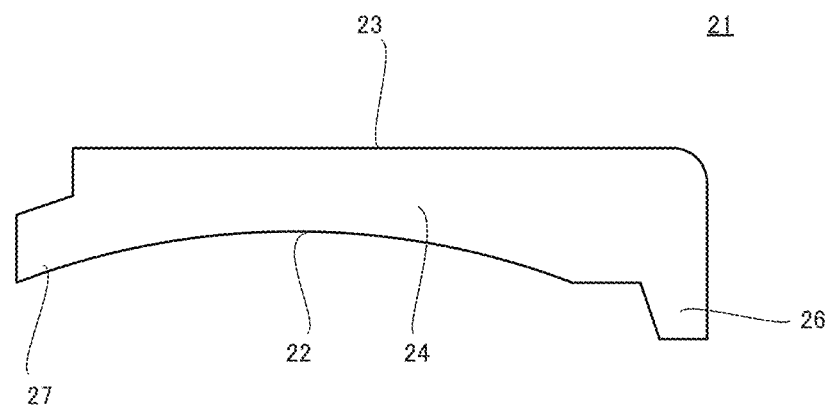
FIG. 4B is a bottom view of divided piece 21.

FIG. 4A is a plan view of divided piece 21. FIG. 4B is a bottom view of divided piece 21. Each divided piece 21 has a side surface 22, a side surface 23, a bottom surface 24, and a top surface 25, as shown in FIGS. 4A and 4B. Each divided piece further has a first protrusion 26 and a second protrusion 27.

Side surface 22 faces side surface 11*b* (first surface 11*ba* to fourth surface 11*bd*) with cutting-edge insert 20 being attached to substrate 10. Side surface 22 has a shape extending along side surface 11*b* (first surface 11*ba* to fourth surface 11*bd*). Side surface 23 is opposite to side surface 22 and is contiguous to side surface 10*c* with cutting-edge insert 20 being attached to substrate 10. Side surface 23 is a flank face of cutting insert 100.

Bottom surface 24 is opposite to top surface 10*b* with cutting-edge insert 20 being attached to substrate 10. Top surface 25 is opposite to bottom surface 24. For example, top surface 25 is flush with top surface 11*a* with cutting-edge insert 20 being attached to substrate 10. Top surface 25 is a rake face of cutting insert 100. The ridgeline between side surface 23 and top surface 25 is a cutting edge of cutting insert 100.

First protrusion 26 is located at one end of divided piece 21 in the longitudinal direction, and second protrusion 27 is located at the other end of divided piece 21 in the longitudinal direction. First protrusion 26 protrudes from the one end of divided piece 21 in the longitudinal direction along the direction crossing the longitudinal direction of divided piece 21. Second protrusion 27 protrudes from the other end of divided piece 21 in the longitudinal direction along the longitudinal direction of divided piece 21.

Figure 5:
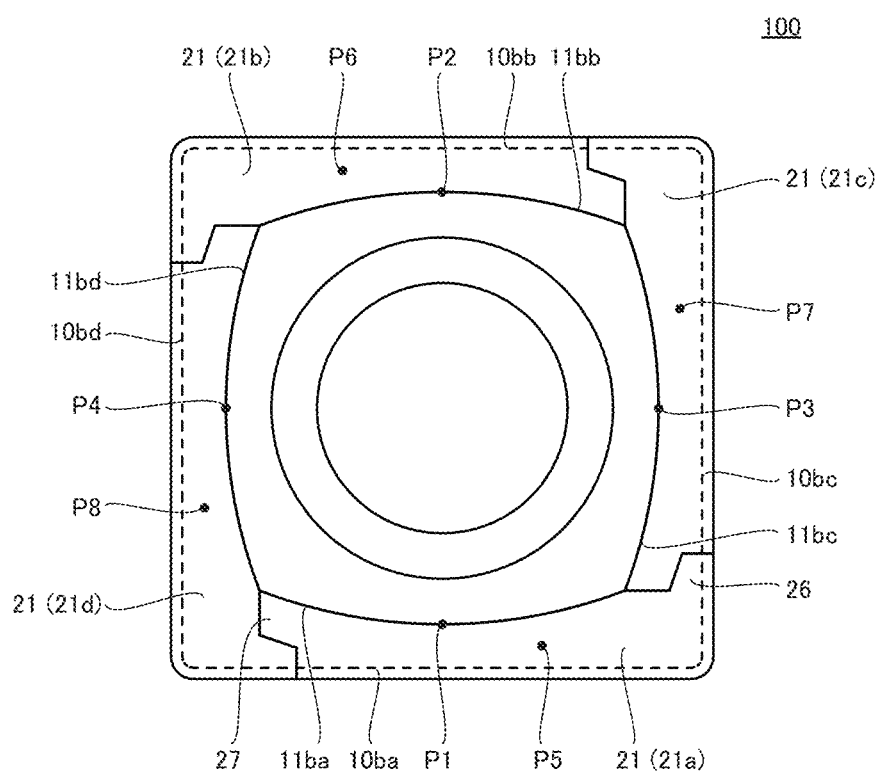
FIG. 5 is a plan view of cutting insert 100.

FIG. 5 is a plan view of cutting insert 100. As shown in FIG. 5, first protrusion 26 of divided piece 21*a* retains second protrusion 27 of divided piece 21*c* between third surface 11*bc* and first protrusion 26 of divided piece 21*a*. First protrusion 26 of divided piece 21*b* retains second protrusion 27 of divided piece 21*d* between fourth surface 11*bd* and first protrusion 26 of divided piece 21*b*.

First protrusion 26 of divided piece 21*c* retains second protrusion 27 of divided piece 21*b* between second surface 11*bb* and first protrusion 26 of divided piece 21*c*. First protrusion 26 of divided piece 21*d* retains second protrusion 27 of divided piece 21*a* between first surface 11*ba* and first protrusion 26 of divided piece 21*d*. Specifically, with cutting-edge insert 20 being attached to substrate 10, first protrusion 26 of one divided piece 21 retains second protrusion 27 of another divided piece 21, which is adjacent to the one divided piece 21, between side surface 11*b* and first protrusion 26 of the one divided piece 21.

The positions of the centers of gravity of divided piece 21*a* to divided piece 21*d* are referred to as a position of the center of gravity P5 to a position of the center of gravity P8, respectively. With cutting-edge insert 20 being attached to substrate 10, position of the center of gravity P5 is displaced from vertex P1 toward the one end of divided piece 21a in the longitudinal direction of divided piece 21a, and position of the center of gravity P6 is displaced from vertex P2 toward the one end of divided piece 21b in the longitudinal direction of divided piece 21b.

With cutting-edge insert 20 being attached to substrate 10, position of the center of gravity P7 is displaced from vertex P3 toward the one end of divided piece 21e in the longitudinal direction of divided piece 21c, and position of the center of gravity P8 is displaced from vertex P4 toward the one end of divided piece 21d in the longitudinal direction of divided piece 21d. In other words, the positions of the centers of gravity of divided pieces 21 are displaced from the vertices of the curved lines indicating side surface 11b, respectively, in the longitudinal direction of divided piece 21.

Cutting-edge insert 20 is brazed to substrate 10. More specifically, side surface 22 is jointed to side surface 11b, and bottom surface 24 is joined to top surface 10b. Thus, cutting-edge insert 20 is attached to substrate 10.

Method of Manufacturing Cutting Insert According to Embodiment

A method of manufacturing cutting insert 100 will be described below.

Figure 6:
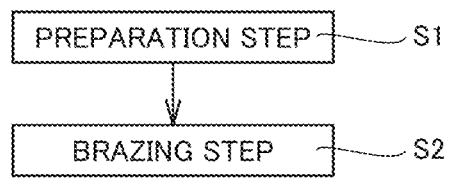
FIG. 6 is a flowchart showing a method of manufacturing cutting insert 100.

FIG. 6 is a flowchart showing the method of manufacturing cutting insert 100. The method of manufacturing cutting insert 100 includes a preparation step S1 and a brazing step S2, as shown in FIG. 6. In preparation step S1, substrate 10 and cutting-edge insert 20 (divided pieces 21) are prepared.

In brazing step S2, cutting-edge insert 20 is brazed to substrate 10. More specifically, first, a brazing material is applied onto top surface 10b and side surface 11b. Second, each of divided pieces 21 is placed on substrate 10 such that bottom surface 24 and side surface 22 face top surface 10b and side surface 11b, respectively, with the brazing material in between. Third, substrate 10 on which divided pieces 21 are placed is put into a heating furnace. As a result, the brazing material melts, and divided pieces 21 are joined to substrate 10.

Effects of Cutting Insert According to Embodiment

The effects of cutting insert 100 will be described below by comparison with a cutting insert (hereinafter referred to as "cutting insert 100A") according to a first comparative example and a cutting insert (hereinafter referred to as "cutting insert 100B") according to a second comparative example.

Figure 7:
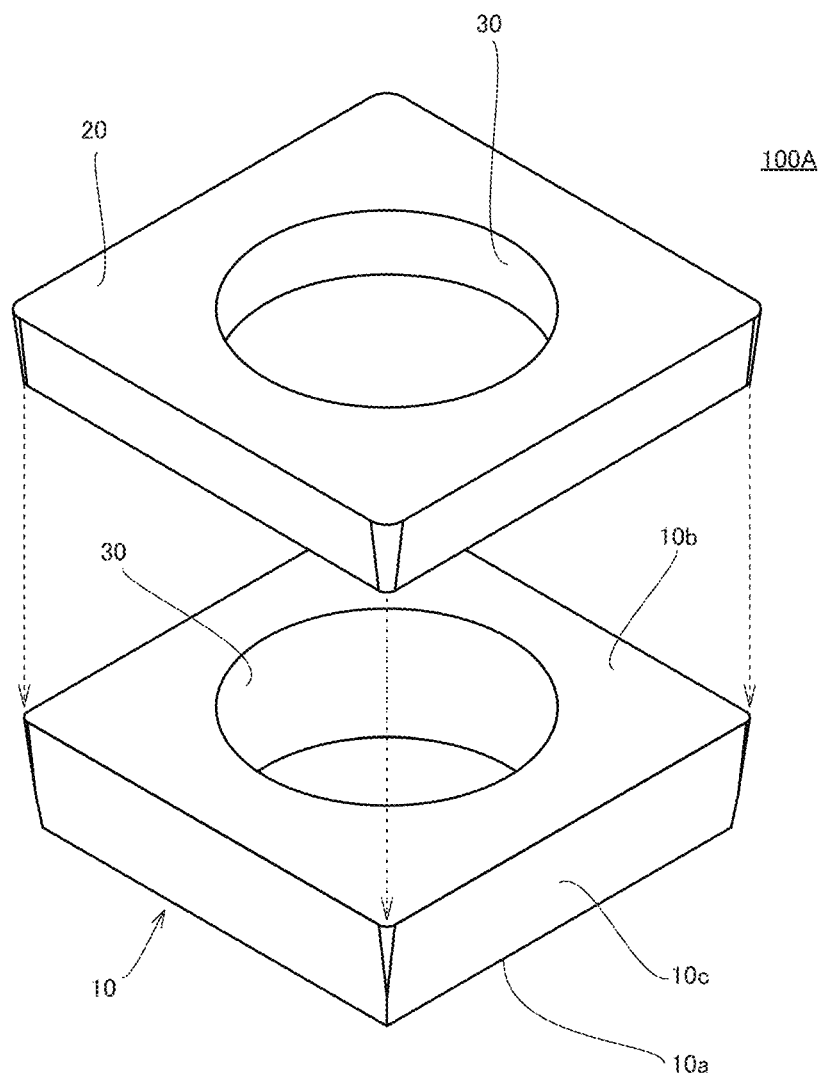
FIG. 7 is an exploded perspective view of a cutting insert 100A.

FIG. 7 is an exploded perspective view of cutting insert 100A. As shown in FIG. 7, cutting insert 100A includes substrate 10 and cutting-edge insert 20. In cutting insert 100A, substrate 10 has no projection 11. Also, in cutting insert 100A, cutting-edge insert 20 is not divided into divided pieces 21 and is attached to the entire top surface 10b by brazing. In these respects, the structure of cutting insert 100A is different from the structure of cutting insert 100.

In cutting insert 100A, since cutting-edge insert 20 is not divided into divided pieces 21, no gap is formed between divided pieces 21 due to a surface tension of the melted brazing material in brazing of cutting-edge insert 20 to substrate 10.

In cutting insert 100A, however, since cutting-edge insert 20 is attached to the entire top surface 10b, an increasing amount of raw material is used for cutting-edge insert 20, thus increasing the cost for manufacturing the cutting insert. This is more conspicuous when a relatively costly raw material, such as a cubic boron nitride sintered material or a polycrystalline diamond sintered material, is used for cutting-edge insert 20.

In cutting insert 100A, not only substrate 10 but also cutting-edge insert 20 needs to be bored to form through-hole 30. An increasing amount of time and an increasing processing cost are required for this boring, thus reducing the productivity of cutting insert 100A.

Figure 8:
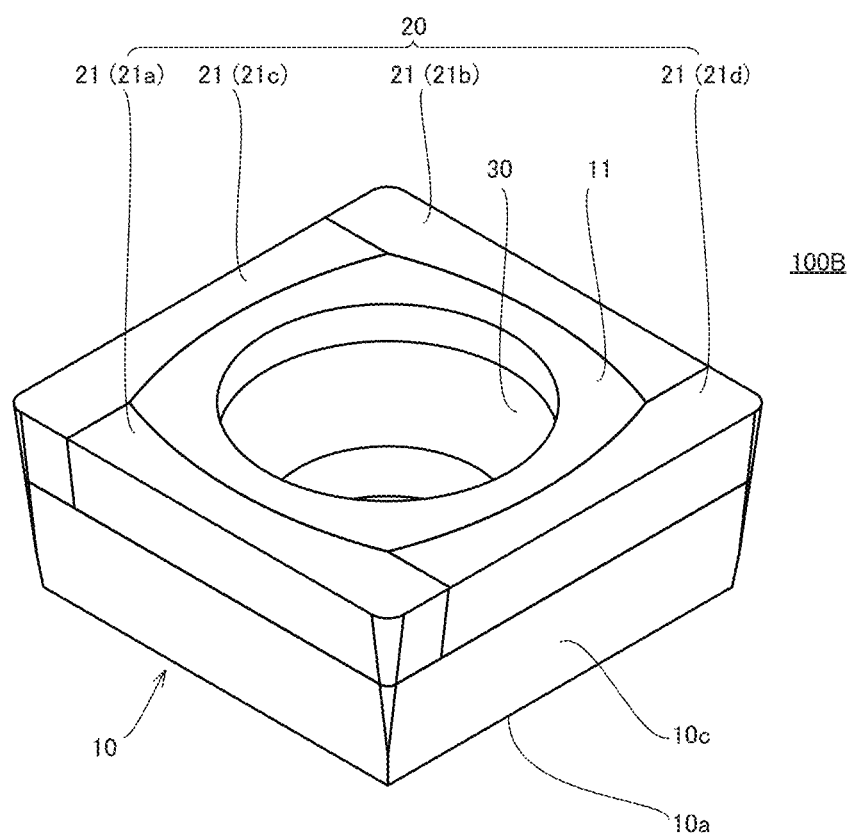
FIG. 8 is a perspective view of a cutting insert 100B.

FIG. 8 is a perspective view of cutting insert 100B. As shown in FIG. 8, cutting insert 100B includes substrate 10 and cutting-edge insert 20. Substrate 10 of cutting insert 100B is similar to substrate 10 of cutting insert 100. Cutting-edge insert 20 of cutting insert 100B is similar to cutting-edge insert 20 of cutting insert 100 in that cutting-edge insert 20 is divided into divided pieces 21.

In cutting insert 100B, however, each divided piece 21 has no first protrusion 26 nor second protrusion 27. In this respect, the structure of cutting insert 100B is different from the structure of cutting insert 100.

In cutting insert 100B, since cutting-edge insert 20 is arranged to annularly surround projection 11, substrate 10 has no projection 11. Accordingly, the amount of a raw material used for cutting-edge insert 20 is reduced more than when cutting-edge insert 20 needs to be attached to the entire top surface 10b.

In cutting insert 100B, cutting-edge insert 20 does not need to be bored to form through-hole 30. Thus, cutting insert 100B can be manufactured at a lower cost than cutting insert 100A.

In cutting insert 100B, however, since cutting-edge insert 20 is divided into divided pieces 21, a gap may be formed between divided pieces 21 due to a surface tension of the melted brazing material in brazing of cutting-edge insert 20 to substrate 10.

Figure 9:
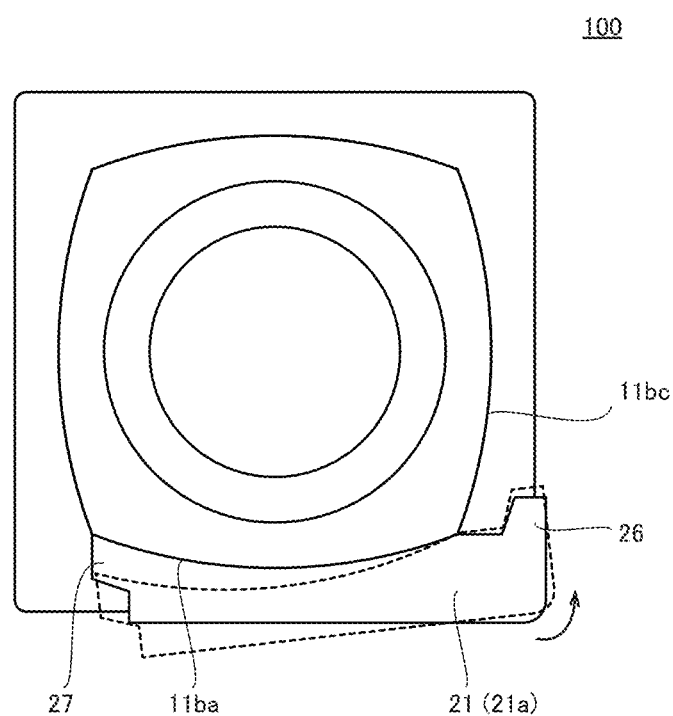
FIG. 9 is a schematic view for describing effects of cutting insert 100.

FIG. 9 is a schematic view for describing effects of cutting insert 100. As shown in FIG. 9, in cutting insert 100, first surface 11ba projects to the side opposite to through-hole 30. Accordingly, as the brazing material melts, divided piece 21a attempts to rotate along first surface 11ba due to a surface tension of the melted brazing material.

Also, since position of the center of gravity P5 is displaced from vertex P1 toward one end of divided piece 21a in the longitudinal direction of divided piece 21a, divided piece 21a tends to rotate due to a surface tension of the melted brazing material such that first protrusion 26 is closer to third surface 11bc and second protrusion 27 is farther from first surface 11ba (i.e., divided piece 21a tends to rotate counterclockwise in FIG. 9). Similarly, divided piece 21b to divided piece 21d also tend to rotate in the same direction as that of divided piece 21a.

However, first protrusion 26 of divided piece 21a retains second protrusion 27 of divided piece 21c between third surface 11bc and first protrusion 26 of divided piece 21a, and first protrusion 26 of divided piece 21b retains second protrusion 27 of divided piece 21d between fourth surface 11bd and first protrusion 26 of divided piece 21b. Also, first protrusion 26 of divided piece 21e retains second protrusion 27 of divided piece 21b between second surface 11bb and first protrusion 26 of divided piece 21c, and first protrusion 26 of divided piece 21d retains second protrusion 27 of divided piece 21a between first surface 11ba and first protrusion 26 of divided piece 21d.

Consequently, such a rotation of divided piece 21c that second protrusion 27 attempts to be farther from third surface 11bc is suppressed by such a rotation of divided piece 21a that first protrusion 26 attempts to be closer to third surface 11bc, and such a rotation of divided piece 21d that second protrusion 27 attempts to be farther from fourth surface 11bd is suppressed by such a rotation of divided piece 21b that first protrusion 26 attempts to be closer to fourth surface 11bd.

Similarly, such a rotation of divided piece 21b that second protrusion 27 attempts to be farther from second surface 11bb is suppressed by such a rotation of divided piece 21c that first protrusion 26 attempts to be closer to second surface 11bb, and such a rotation of divided piece 21a that second protrusion 27 attempts to be farther from first surface 11ba is suppressed by such a rotation of divided piece 21d that first protrusion 26 attempts to be closer to first surface 11ba.

As described above, in cutting insert 100, divided pieces 21 rotate in the same direction due to the surface tension of the melted brazing material, so that the rotations of divided pieces 21 are mutually suppressed. This suppresses the generation of a gap generated between divided pieces 21.

In cutting insert 100, also, the amount of the raw material used for cutting-edge insert 20 can be reduced, and the processing cost for forming through-hole 30 can be reduced, as in cutting insert 100B. In cutting insert 100, further, since the ridgeline between side surface 23 located at first protrusion 26 and top surface 25 located at first protrusion 26 can be used as a cutting edge, more portions of cutting-edge insert 20 can be used as cutting edges than in cutting insert 100B.

In cutting insert 100, the width of divided piece 21 can be reduced when distance DIS1 is larger than distance DIS2. Thus, the amount of the raw material used for cutting-edge insert 20 can be reduced further.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 100, 100A, 100B cutting insert; 10 substrate; 10a bottom surface; 10b top surface; 10ba first side; 10bb second side; 10bc third side; 10bd fourth side; 10c side surface; 11 projection; 11a top surface; 11b side surface; 11ba first surface; 11bb second surface; 11bc third surface; 11bd fourth surface; 20 cutting-edge insert; 21, 21a, 21b, 21c, 21d divided piece; 22, 23 side surface; 24 bottom surface; 25 top surface; 26 first protrusion; 27 second protrusion; 30 through-hole; C center; DIS1, DIS2 distance; P1, P2, P3, P4 vertex; P5, P6, P7, P8 position of the center of gravity; S1 preparation step; S2 brazing step.

The invention claimed is:

1. A cutting insert comprising:
a substrate; and
a cutting-edge insert, wherein
the substrate has in a thickness direction of the substrate
a bottom surface, and
a top surface opposite to the bottom surface,
the top surface has a polygonal shape composed of a plurality of sides in a plan view as seen along the thickness direction,
the top surface is provided with a projection projecting to a side opposite to the bottom surface along the thickness direction,
the projection has a through-hole passing through the substrate along the thickness direction,
the projection has a side surface contiguous to the top surface,
the side surface is composed of a curved line protruding to a side opposite to the through-hole in the plan view as seen along the thickness direction,
the curved line includes a plurality of vertices at positions at which the curved line has a minimum distance from the plurality of sides, respectively,
the cutting-edge insert is brazed to the top surface and the side surface so as to annularly surround the projection,
the cutting-edge insert includes a plurality of divided pieces,
a number of the plurality of divided pieces is equal to a number of the plurality of sides,
the plurality of divided pieces in a longitudinal direction extend along the plurality of sides, respectively,
each of the plurality of divided pieces has in the longitudinal direction
a first end, and
a second end opposite to the first end,
each of the plurality of divided pieces has
a first protrusion at the first end, and
a second protrusion at the second end,
the first protrusion of one divided piece among the plurality of divided pieces retains the second protrusion of another divided piece among the plurality of divided pieces between the side surface and the first protrusion of the one divided piece, the other divided piece being adjacent to the one divided piece, and
positions of centers of gravity of the plurality of divided pieces are displaced from the plurality of vertices, respectively, in the longitudinal direction.

2. The cutting insert according to claim 1, wherein
the curved line is composed of a plurality of partial arcs,
the plurality of partial arcs face the plurality of sides, respectively, and
in the plan view as seen along the thickness direction, a distance between a corner of the projection and a center of the through-hole is larger than a distance between each of the plurality of vertices and the center.

3. The cutting insert according to claim 1, wherein the cutting-edge insert is made of a cubic boron nitride sintered material or a polycrystalline diamond sintered material.

4. The cutting insert according to claim 2, wherein the cutting-edge insert is made of a cubic boron nitride sintered material or a polycrystalline diamond sintered material.

* * * * *